(12) United States Patent
Hubin et al.

(10) Patent No.: US 8,838,911 B1
(45) Date of Patent: Sep. 16, 2014

(54) SYSTEMS, METHODS, AND SOFTWARE FOR INTERLEAVED DATA STREAM STORAGE

(75) Inventors: Mortimer Hubin, Laval (CA); Sylvain Ouellet, Laval (CA)

(73) Assignee: Verint Systems Inc., Santa Clara, CA (US)

( * ) Notice: Subject to any disclaimer, the term of this patent is extended or adjusted under 35 U.S.C. 154(b) by 239 days.

(21) Appl. No.: 13/416,599

(22) Filed: Mar. 9, 2012

Related U.S. Application Data

(60) Provisional application No. 61/450,722, filed on Mar. 9, 2011.

(51) Int. Cl.
*G06F 12/00* (2006.01)
(52) U.S. Cl.
USPC .......................................... 711/147; 711/156
(58) Field of Classification Search
CPC .......................... G06F 12/1072; G06F 13/1663
USPC .................................................. 711/147, 156
See application file for complete search history.

(56) References Cited

U.S. PATENT DOCUMENTS

2004/0228342 A1* 11/2004 Morris .......................... 370/389

* cited by examiner

*Primary Examiner* — Shawn X Gu
(74) *Attorney, Agent, or Firm* — Meunier Carlin & Curfman

(57) ABSTRACT

Methods, systems, and software are provided herein that allow a user to store and retrieve data records. In one example, a method of storing data records is provided. The method includes initializing a shared write pointer to a first location in a shared memory of a data storage system, and receiving a plurality of data records transferred by a plurality of data sources for storage in the shared memory. The method also includes, beginning with a first of the plurality of data sources, writing in a cyclic sequence one of the plurality of data records for each of the plurality of data sources based on the shared write pointer, and incrementing the shared write pointer after each writing, and updating at least a header portion of the shared memory with the shared write pointer responsive to each writing.

19 Claims, 8 Drawing Sheets

SYSTEMS, METHODS, AND SOFTWARE FOR INTERLEAVED DATA STREAM STORAGE

RELATED APPLICATIONS

This application claims the benefit of U.S. Provisional Application Ser. No. 61/450,722, filed on Mar. 9, 2011, and entitled "INTERLEAVED DATA STREAM STORAGE", which is hereby incorporated by reference in its entirety.

TECHNICAL FIELD

Aspects of the disclosure are related to the field of video data storage and, and in particular, storing video data streams in interleaved storage systems.

TECHNICAL BACKGROUND

Many common data systems capture data from multiple data sources. It is often desirable to have data from these multiple data sources stored on the same storage device or within the same storage system. These types of systems often capture and store large quantities of data over extended periods of time. These large quantities of data require large amounts of storage space and new data is often being acquired and stored on an ongoing basis. Consequently, the amount of available storage space can become a limiting factor.

A need to access or use the stored data may not arise for a significant period of time after it has been stored. Because it is difficult to know when a need for the data may arise, it is challenging to know how long to keep the data before it is deleted. As a result, the data is often retained until it must be deleted in order to make space available for recently acquired data. One approach is to delete or overwrite the oldest data as it should be the least likely to be needed in the future.

Data systems typically store data in files or some other type of file-based format. As long as space is available, it is often desirable to retain data as long as possible in case a later need for the data arises. Consequently, storage devices are often completely filled with data and the old data deleted or overwritten only when additional storage space is needed for new data.

One example of a data system like that described above is a video system used for security or surveillance applications. In these security and surveillance applications, multiple cameras or video sources are used to capture video of multiple scenes or locations. The video is often stored in a single storage system enabling a user to more easily work with the combined video, search video from multiple sources, link video from multiple sources, or perform other activities involving segments of video that may have been received from more than one video source.

The specific events, scenes, or incidents in the video that may be of interest are often not known ahead of time. Consequently, video is captured and stored over extended periods of time, if not continuously, in order to improve the chances of capturing unexpected, unplanned, or presently unknown incidents or occurrences. It is often not known when a need for the video may arise, so it is desirable to store the video and have it available for use as long as reasonably possible in case a need arises. The desire to have the video available as long as possible is counterbalanced by the limited storage space that may be available in the storage devices, systems, or locations.

Multiple methodologies and types of file systems are used for storing video in these types of applications. Video from each source is typically stored in its own file. If contiguous physical storage space is available on the storage device, video associated with a single file may be stored in a contiguous physical storage space as much as is possible. As files are deleted and added, scattered pockets of available storage space may become available, particularly if the added and deleted files are of different sizes. As a result, video making up a single file may be scattered across multiple physical locations on the storage device or storage devices, and the storage device becomes fragmented with the various files.

When video files are stored in the manner described above, a storage system that is receiving and storing video streams from multiple sources must constantly move between several physical locations to store those video streams, because the files associated with each of the video sources are in different physical locations of the device or devices.

Indexes, such as file allocation tables, must be used to keep track of where each file is located and where the next record in each of the streams should be stored with respect to each of the files. If a disk drive is being used to store the video, read and write heads of the disk drive must move to a different place on the disk as it cycles through the process of storing records or other discrete segments of video associated with each of the video sources. This can be limiting as the time to identify the next write location and reposition the head to that location may be very time consuming and may have to be performed many times per second for each data stream.

In addition, the problem of deleting old video in order to make room for new video on a storage device that is full suffers some of the same challenges. In order to keep old video as long as possible, old files are often not deleted until new video has arrived, or is about to arrive, for which the storage space is needed. Because the oldest data may be scattered around in various physical locations, the storage device or storage device controller must perform additional tasks or processes to determine which video is the oldest, where it is located, and take the necessary actions to move the head to that location to erase or overwrite the data. This process is time consuming and means that new data is further stored in non-sequential or non-contiguous physical locations on the storage device or devices.

In examples where data is stored in large files, it can be time consuming to retrieve the large files, remove an old portion of the file, and re-write the file to the storage device. If the old portion of the file is at the beginning portion of the file, a truncation process is slow and cumbersome as the disk drive must read the entire file, modify the file accordingly, and re-write the file back to the storage medium.

Overview

Methods, systems, and software are provided herein that allow a user to store and retrieve data records. In a first example, a method of storing data records is provided. The method includes initializing a shared write pointer to a first location in a shared memory of a data storage system, and receiving a plurality of data records transferred by a plurality of data sources for storage in the shared memory. The method also includes, beginning with a first of the plurality of data sources, writing in a cyclic sequence one of the plurality of data records for each of the plurality of data sources based on the shared write pointer, and incrementing the shared write pointer after each writing, and updating at least a header portion of the shared memory with the shared write pointer responsive to each writing.

In a second example, a data storage system is disclosed. The data storage system includes a plurality of data sources, a shared storage volume accessible to the plurality of data sources, and a storage controller. The storage controller is configured to receive a first data record, identify a source of said first data record to generate a source identifier, store on the shared storage volume source identifier identified in the first data record in an index, store on the shared storage volume the first data record at a first storage location indicated by a pointer, and increment the pointer after storing the first data record. The storage controller is also configured to receive a second data record, and store on the shared storage volume the second data record at a second storage location indicated by the incremented pointer.

In a third example, a computer readable medium is disclosed. The computer readable medium has instructions stored thereon, that when executed, perform the steps of receiving in a data storage system a first data record, identifying a source of said first data record to generate a source identifier, storing the source identifier identified in the first data record in an index, storing the first data record at a first storage location indicated by a pointer, and incrementing the pointer after storing the first data record. The computer readable medium has further instructions stored thereon, that when executed, perform the steps of receiving a second data record, and storing the second data record at a second storage location indicated by the incremented pointer.

DETAILED DESCRIPTION

Figure 1:
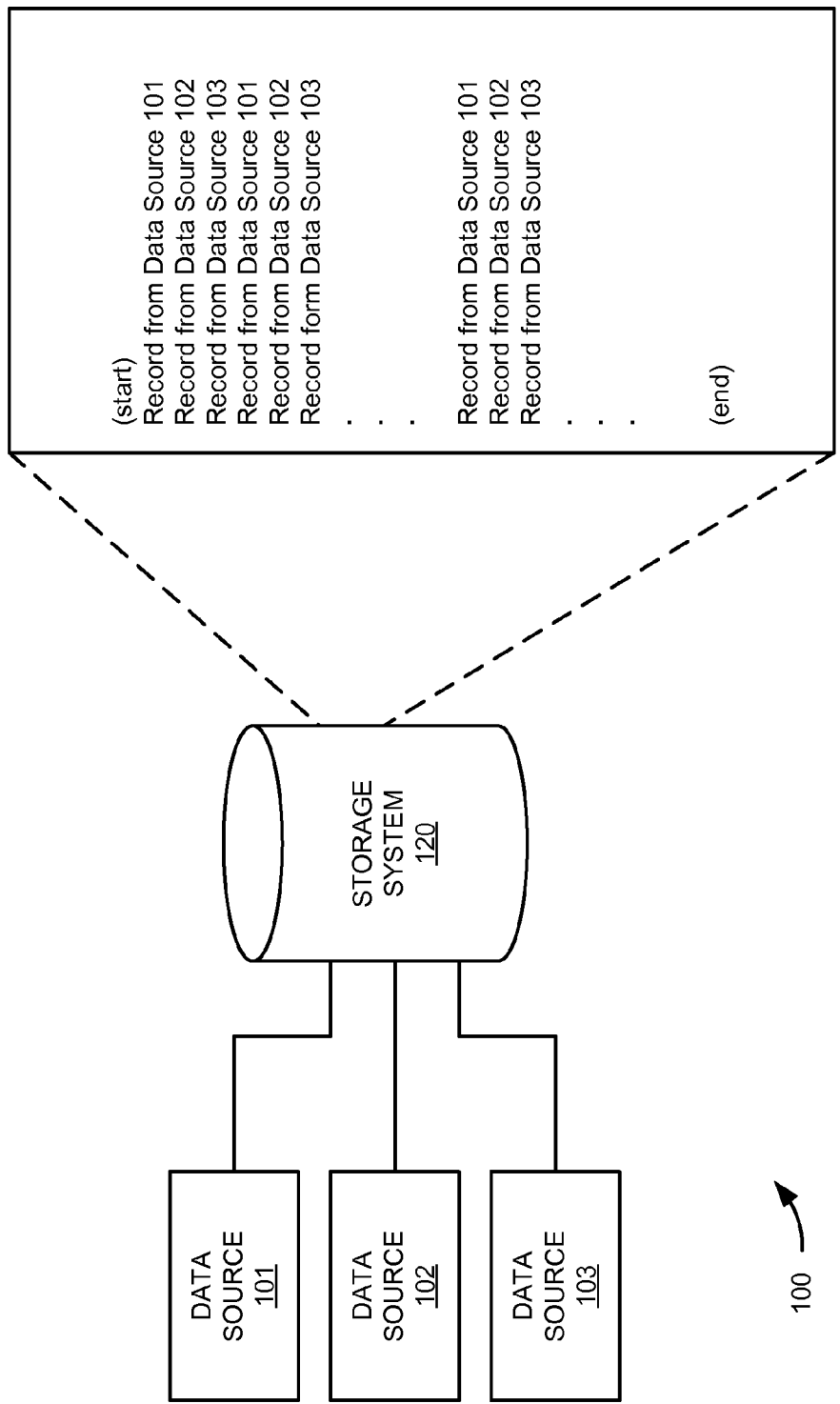
FIG. 1 is a system diagram illustrating a data system.

FIG. 1 illustrates data system 100 for storing streams of data. Data system 100 comprises data sources 101-103 and storage system 120. Data is received from data sources 101-103 and is stored in storage system 120. FIG. 1 also illustrates an example view of how data records from data sources 101-103 are stored in storage system 120.

Figure 2:
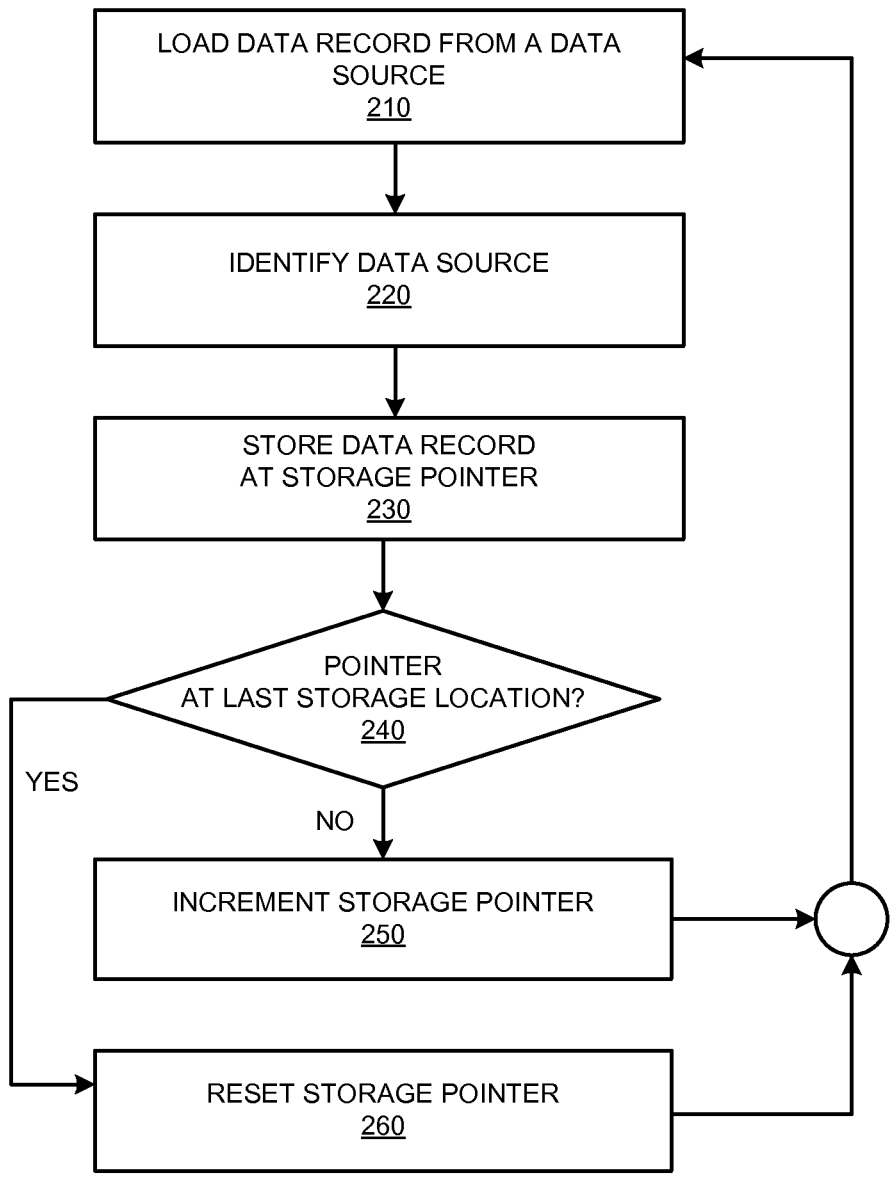
FIG. 2 is a flow diagram illustrating a method of operating a data system.

FIG. 2 illustrates an operation of data system 100. The steps of the operation are indicated below parenthetically. When receiving record-coherent streams of data from one or more of data sources 101-103 in parallel, storage system 120 stores records from each of the data sources in the storage system 120. In particular, the storage system 120 loads a data record from the current data source (210), identifies the data source (220), and stores the data record at a storage location identified by the storage pointer (230) in a sequential and chronological fashion. A determination is then made as to whether the pointer is currently at the last storage location on the storage device (240). If the pointer is at the last storage location, the pointer is reset to the start, or first data location of the storage device (250). If not, the storage pointer is incremented to the next location (260). The next data record is then loaded (210) into the storage system 120 from one of the data sources 101-103.

Figure 3:
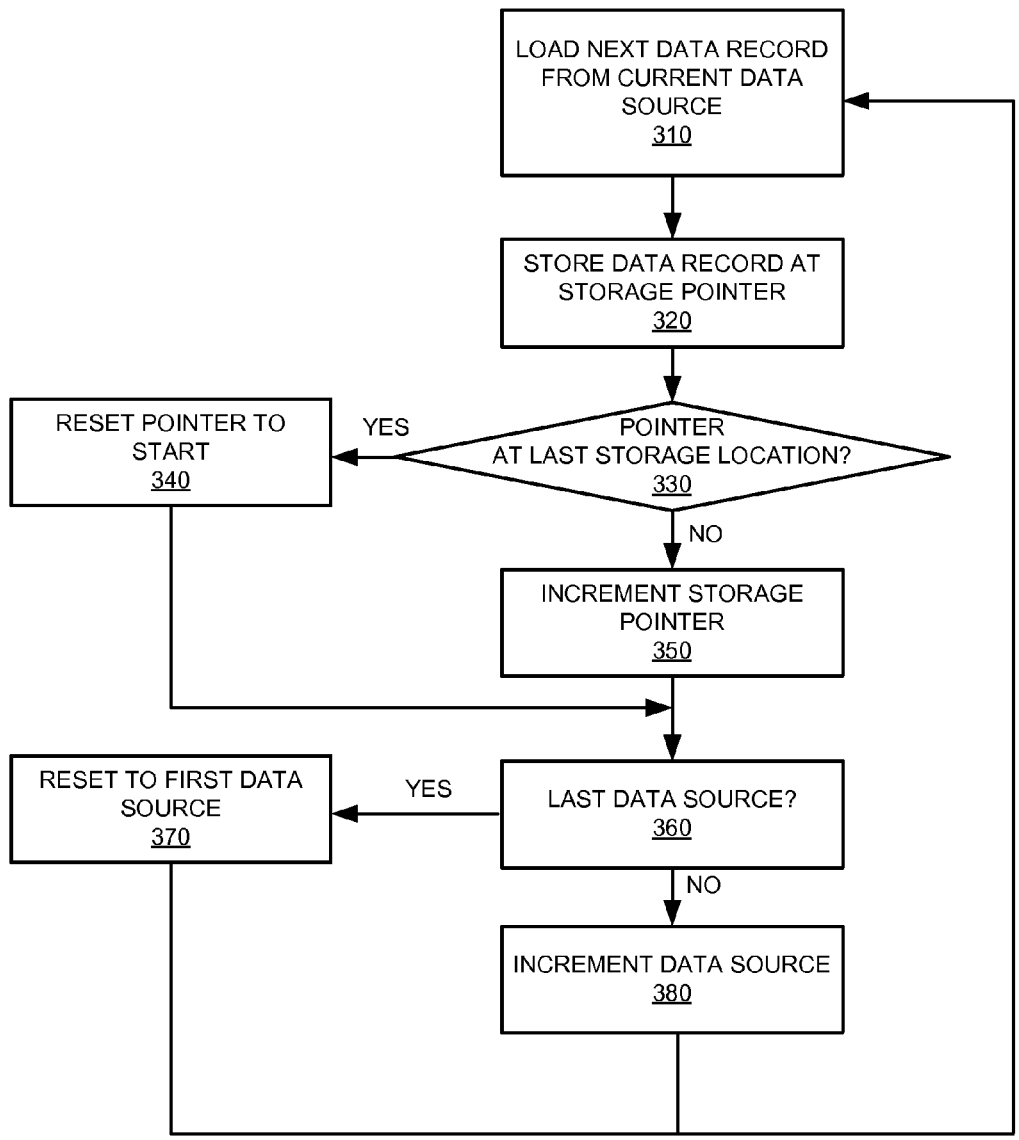
FIG. 3 is a flow diagram illustrating a method of operating a data system.

In at least one example, the storage system 120 may sequentially cycle through the data sources 101-103 while storing data records. Such a method is shown more fully in FIG. 3 and references the operation of data system 100 parenthetically. As shown in FIG. 3, such a method includes loading a data record from a data source (310). The current data source of each data records may be known when it is received. In particular, the storage system 120 may load the data in a known sequence, as discussed herein.

Referring still simultaneously to FIGS. 1 and 3, after the storage system loads the data records from the data sources 101-103, the storage system then stores the data record at a storage location identified by the storage pointer (320) in a sequential and chronological fashion. A determination is then made as to whether the pointer is currently at the last storage location on the storage device (330). If the pointer is at the last storage location, the pointer is reset to the start, or the first data location of the storage device (340). If not, the storage pointer is incremented to the next location (350).

Next, a determination is made as to whether the record just stored was associated with the last data source in the series or sequence of active data sources (360). If the data source is the last one in the sequence, an indicator is reset to the first data source in the sequence (370). For example, records may be received from data sources 101, 102, and 103 in that order. When the most recently stored record was from data source 103, the indicator is reset to data source 101. In the alternate case, the indicator is incremented to the next data source (380). For example, after a data record from data source 101 is stored, the indicator is incremented to data source 102. In either case, the next data record from the current data source is loaded and the process continues (310).

One possible result of the operation illustrated in FIG. 3 is the sample data view of how data records are stored in FIG. 1. As data records from the data streams associated with each of data sources 101-103 are received, they are interleaved and stored in a chronological fashion starting at the first available storage location of the storage system 120. The records continue to be stored in an interleaved, chronological fashion by moving from the beginning to the end of the available storage space in storage system 120 in a contiguous manner.

Records are written to the next location regardless of whether that location was previously occupied by older data. When the process reaches the end of the available space on storage system 120, the process continues at the start, or beginning, location. In this way, once storage system 120 is initially full of data, a new record automatically overwrites the oldest data record in storage system 120 without having to perform the processes of determining if the device is full, determining which data is the oldest, resetting a pointer to that location, and moving a head or other write mechanism to that location.

It should be understood that the operation described above provides a simplified description of the operation of data system 100. Other headers and file management information may be stored in storage system 120 in conjunction with the data records. In other words, the first record may not be stored at the first physical location on storage system 120. Other types of file management information may be stored before, after, or among the data records.

It should also be understood that data system 100 will operate in fundamentally the same manner even if all contiguous storage space in storage system 120 is not available. For example, storage system 120 or the storage devices that make up storage system 120 may have areas which are unavailable for various reasons. Data system 100 may continue to use the available space as if it were contiguous, as described above.

Data sources 101-103 may comprise any device having the capability to transmit data. Data sources 101-103 comprise circuitry and an interface for transmitting the data. Data sources 101-103 may be the devices which perform the initial capture of the data or may be intermediate transfer devices.

For example, data sources 101-103 may be computers, communication devices, cameras, servers, routers, transmitters, databases, or other data transfer devices, including combinations thereof.

Storage system 120 comprises any device for storing digital data. Storage system 120 receives data from data sources 101-103 and stores the data for later use or retrieval. Storage system 120 comprises components for storage of data and an interface for receiving data. The storage components of storage system 120 may comprise a disk drive, optical disk, flash memory, solid state memory, tape drive, or other device for storage of digital data, including combinations thereof. Storage system 120 may also comprise additional interfaces for transmitting or receiving video or images, user interface software, power supply, or structural support. Storage system 120 may also be a server, disk array, database, or another device that provides storage of digital data.

The steps described in FIGS. 2 and/or 3 may be performed in storage system 120, may be performed by an external device, or some combination thereof. A storage controller or other type of data management device may be used in conjunction with data sources 101-103 and storage system 120 to assist with or control these processes.

Figure 4:
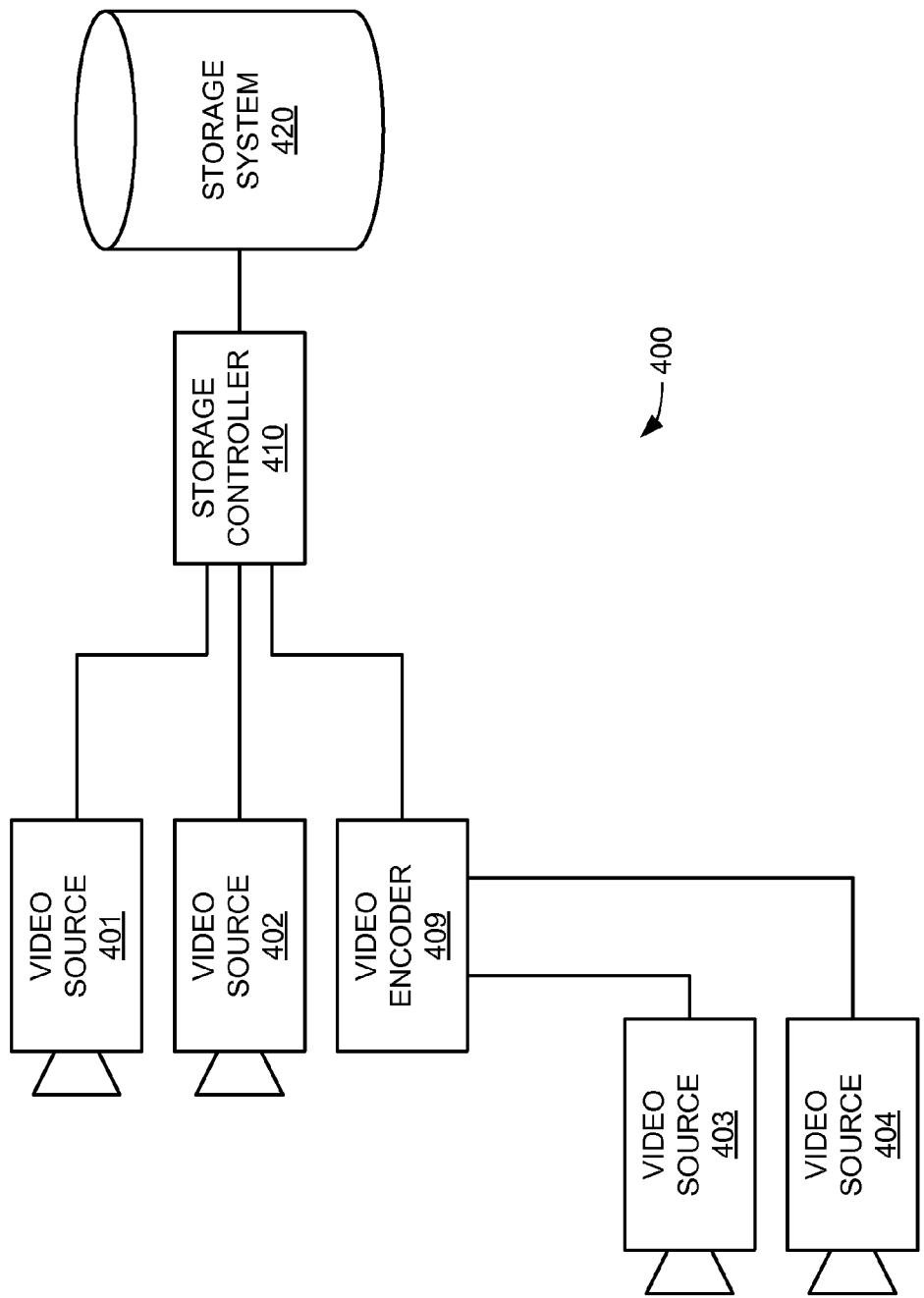
FIG. 4 is a system diagram illustrating a video system.

FIG. 4 illustrates video system 400, which stores multiple streams of video data. Video system 400 comprises video sources 401-404, video encoder 409, storage controller 410, and storage system 420. Storage controller 410 receives data streams containing frames of video from video sources 401-402 and video encoder 409 and stores them in storage system 420 in a manner similar to that described in FIGS. 1-3 and the accompanying descriptions above.

Video sources 401-404 may comprise any device having the capability to capture video or images. Video sources 401-404 comprise circuitry and an interface for transmitting the video or images. Video sources 401-404 may be the devices which perform the initial optical capture of the video segments or may be intermediate transfer devices. For example, video sources 401-404 may be video cameras, still cameras, internet protocol (IP) cameras, video switches, video buffers, video servers, or other video transmission devices, including combinations thereof.

Video encoder 409 processes, converts, or formats video, video streams, or images. Video encoder 409 comprises processing circuitry and an interface for receiving and transmitting video. Video encoder 409 is capable of performing one or more processes on video received from video sources 403-404. The processes performed on the video may include analog-to-digital conversion, transformations, mathematical computations, modifications, formatting, conditioning, other processes, or combinations thereof. Video encoder 409 may also comprise additional interfaces for transmitting or receiving video, user interface, memory, software, communication components, power supply, or structural support.

Storage controller 410 is capable of receiving multiple video streams and storing them in storage system 420. Storage controller 410 comprises processing circuitry and an interface for receiving and transmitting video. Storage controller 410 may also perform the process of managing where video is stored and where future video will be stored within storage system 420. Storage controller may perform these functions in their entirety, in conjunction with storage system 420, in conjunction with other devices, or combinations thereof.

Storage system 420 is an example of storage system 120, although storage system 420 may have an alternate configuration or operate in alternate manners.

In a manner similar to that illustrated in FIG. 1 and FIG. 2, storage controller 410 receives video records from each of the video streams associated with video sources 401-404. Each video record may be a single video frame or other segment of data of a fixed size. Storage controller 410 then stores those video records in storage system 420 in an interleaved, chronological fashion working from the beginning of the available storage space in storage system 420 towards the end of the available space. Once the end of the available storage space in storage system 420 is reached, the process continues at the beginning of the storage space and the oldest video records, the first ones stored, are overwritten.

It should be understood that storage controller 410 may perform these functions without receiving the video streams. In other words, the video streams from video sources 401-402 and video encoder 409 may flow directly into storage system 420. At the same time, storage controller 410 may control how those streams are stored in storage system 420 with receiving or relaying the video streams.

The entire storage space available in storage system 420 is operated as a circular file or buffer. In this way, the throughput of the storage devices in storage system 420 is maximized. If, for example, disk drives are used, the continuous write operation of the interleaved streams requires minimal, if any, head seeks. The process also results in automatic overwrite of the oldest data after the storage devices have been initially filled. Minimal, if any, additional processes are required to determine which video records are the oldest and manage the process of storing the newest video records in those locations.

Advantageously, the methods of operation described herein are beneficial because, unlike traditional file systems, these methods allow video stream files to be truncated from their beginning. In examples where data is stored in large files, it can be time consuming to retrieve the large files, remove an undesired portion of the file, and re-write the modified file to the storage device. If the undesired portion of the file is at the beginning portion of the file, a truncation process is slow and cumbersome as the storage device, such as a disk drive, must read the entire file, modify the file accordingly, and re-write the file back to the storage medium. In the examples described herein, the file modification process is advantageously reversed. Data is instead automatically removed from the beginning of video stream files or data buffers, especially in the case of grooming old data. As new real-time data is added to a file or buffer, old data is automatically groomed. Thus, data is efficiently truncated from the beginning portions of the associated data buffers, video stream files, or entire file systems, without a cumbersome and slow read-modify-write process.

In addition, one or more indexes may need to be kept in the memory of storage controller 410 or storage system 420 to keep track of the streams available and where they start and end. As storage controller 410 manages the process of writing new video records to storage system 420, these indexes are updated and stored in memory. This memory may be volatile and able to be written without disturbing the primary video record storage processes being conducted in storage system 420. Periodically these indexes are written to the nonvolatile memory of storage system 420 in order to be able to recover if a power failure or other disruption occurs.

The frequency at which the index is written to storage system 420 is a tradeoff between how frequently to disrupt the sequential record-writing process described above and the amount of recent data that may not be easily accessible if a power failure occurred. For instance, if the index is written once per minute, the additional head seek associated with writing this data occurs only once per minute while the most recent one minute of video may be difficult to identify if a power failure or other disruption occurred.

The processes described above also provide efficiency when one or more of the video streams are being read from storage system 420, because the video records are stored in a chronological order on the disk or other storage mechanism. Any suitable method of managing and indexing pointers may be used.

Figure 5:
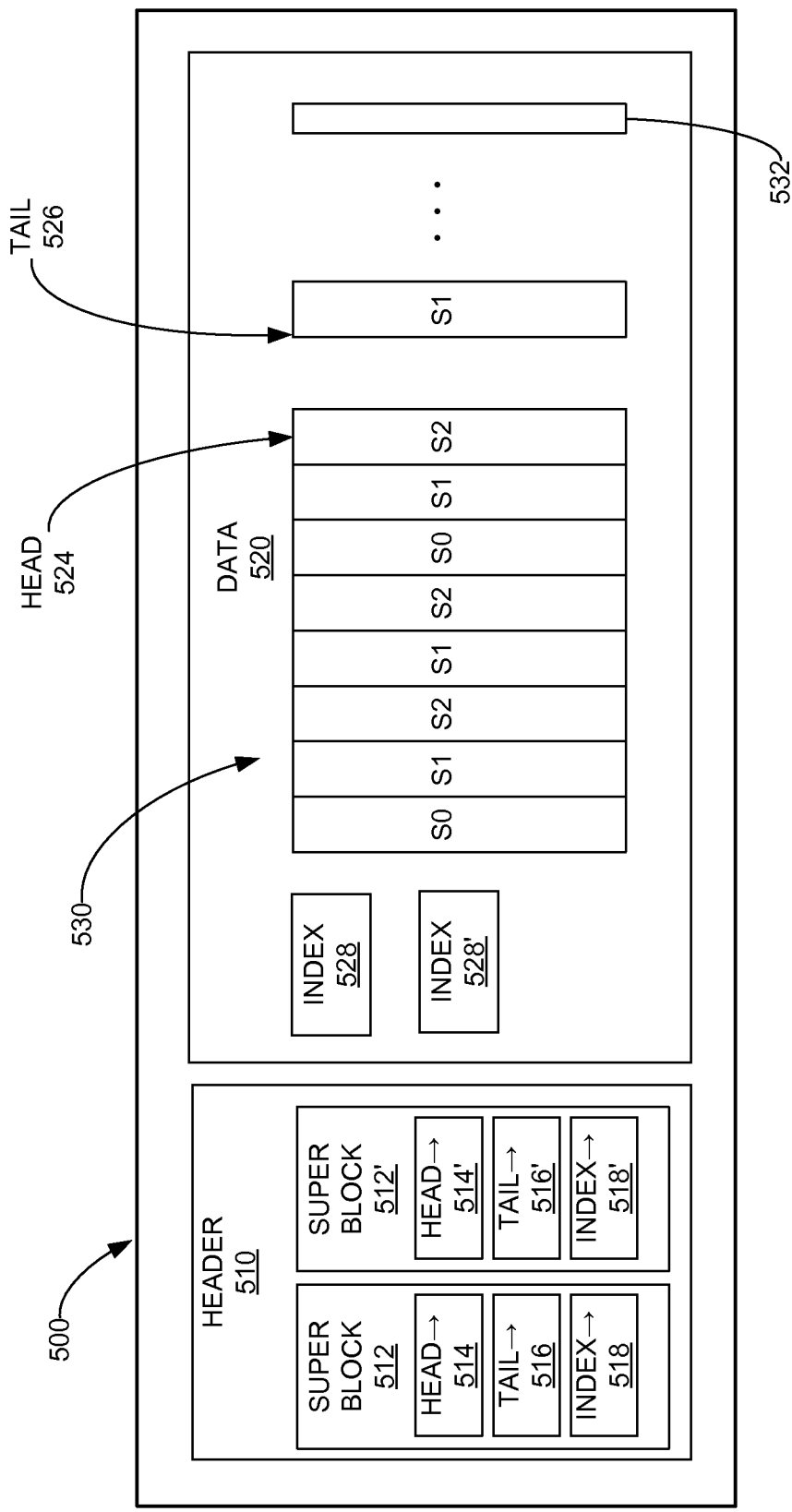
FIG. 5 is a system diagram illustrating a storage system.

FIG. 5 illustrates one example of the organization of video records and the use of indexes and pointers to manage video records. In at least one example, the storage system 500 is a special purpose file system implemented in a user-space library. The storage system 500 may be configured to store streams of data from multiple simultaneous sources, which sources are described in more detail elsewhere herein.

As will be discussed in more detail, the data portion 520 may be written to in a circular manner. When a writer reaches the end of the memory, it continues from the beginning. For each write, unique record markers are automatically inserted and the index is atomically updated. The record markers are used to synchronize a reader at the beginning of a record. A storage system 500 may generally include header portion 510 and a data portion 520.

As shown in FIG. 5, the header portion 510 may generally include a plurality of superblocks 512, 512'. The superblocks 512, 512' may serve as the root data structure of the system. In at least one example, the superblocks 512, 512' may be aligned to the first two blocks of the physical storage, though other locations may be desirable. When writing data to the storage, the storage system will periodically update one of the superblocks 512, 512' in an alternating fashion. As a result, superblocks 512, 512' may have a similar structure.

As a result, each of the superblocks 512, 512' includes a head pointer 514, 514', a tail pointer 516, 516', and an index pointer 518, 518'. The pointers 514-518' point to corresponding data packets located in the data portion 520. Each of the head pointers points to the next writing location. The location at the head 524 within the data portion 520 may be the first byte outside the used storage. Each of the tail pointers 516, 516' points to the tail 526 in the data portion 520, which may be the last byte of storage. In at least one example the tail 526 is not on a packet boundary. It should be noted that in this example, tail 526 is shared for all writes into data portion 520, while head 524 may or not be shared depending upon the configuration of consumers of data 520, as discussed below for FIGS. 7-8.

The index pointers 518, 518' may point to corresponding index packets 528, 528' within the data portion 520. In such an example, each superblock 512, 512' is considered valid only if the associated index packet 528, 528' is also valid. In at least one example, the index packets 528, 528' may be saved in the data portion 520. As a result, multiple copies of the index are stored. This may be useful for data recovery in the event that one of the index packets 528, 528' is corrupted. Accordingly, each of the pointers 514-518 and 514'-518' point to data packets positioned within the data section 520.

In particular, each of the pointers 514-518 and 514'-518' discussed herein includes a plurality of fields including a physical offset field and a rotation counter. The physical offset field may contain the physical offset of the corresponding data relative to the beginning of the data section. The rotation counter may track the number of times the storage system 500 has wrapped when reaching the end of the data section 520. Such a configuration may allow for a ready comparison of two pointers to determine which points to the oldest data. In at least one example, the physical offset is a 64-bit integer to support very large storage.

Although not shown, the superblocks 512, 512' may also include a sequence number. The sequence number is used to select the most recent valid superblock when accessing the storage. Further, the integrity of the superblocks 512, 512' may be protected by a cyclic redundancy check (CRC). As a result, in the event that power is interrupted while the storage system 500 is writing one of the superblocks 512, 512', the other one will be left intact.

As introduced, the data section is divided into packets including the index packets 528, 528', as well as stream packets 530 and null packets 532. In at least one example, stream packets 530 can be written by the user while the index packets 528, 528' and the null packets 532 are internal to the storage system 500. General characteristics of the packets 528-532 will be introduced followed by a more detailed discussion of each of the packet types.

Each of the packets 528-532 are atomic chunks of data. As a result, each time the storage system 500 performs a write operation, one new packet is written to the data portion 520 while a read operation always returns a complete packet (or nothing at all). Accordingly, in one example the packets have a discrete size.

Exemplary packets may start with a header that contains boundary information, type, length, rotation counter, and CRC data followed by optional additional headers and payload. The boundary information is used to mark the beginning of a packet. Also, the boundary information may allow for data recovery. The length includes all headers and payload. The rotation counter is the rotation value from the head pointer when the packet was saved. In at least one example, the rotation counter allows the storage system 500 to reject groomed or un-indexed packets after a power failure.

Further, packets may be written on 16-byte boundary. Padding may be inserted after packets as necessary. Any padding is not accounted for in the packet length as it is not part of the packet. Such an alignment may make searching for the boundary information easier and faster.

Each of the index packets 528, 528' is generated automatically each time one of the superblocks 512,512' is saved. The index may first be compressed with a deflate algorithm. Then, it is protected by a CRC over the whole packet, including headers. The index itself may be an array of s-nodes. An s-node contains the stream state, a pointer to the beginning of the stream, a pointer to the end of the stream, corresponding start and stop timestamps, the stream description, and a stream key. When a user opens a stream, he receives a stream descriptor.

The stream descriptor contains identifying data within the s-node table. Should the user open a stream and wait a very long time before using it, the system could have entirely groomed that stream and re-allocated the stream id to another stream. The stream key is used to minimize the possibility that a user will write to or read from the wrong stream. This field is initialized when the stream is created with a random number. The identification saved with stream packets is used to directly access the index stored within the appropriate index packet 528, 528'.

The stream packets 530 themselves include the data sample stored by the user, such as a video frame. In at least one example, the storage system 500 may be used to store video logs in continuous operation. In such a configuration, a stream packet would be written for each line of log. Eventually, the storage would fill up and the oldest lines would be deleted. In at least one example, a stream packet has a stream packet header after the basic packet header. This stream header contains identification data including the index, a packet sequence number, and a timestamp.

As introduced, the data portion 520 also includes null packets 532. Null packets 532 may be inserted to fill up space too small for writing other packets. For example, if there is 100 bytes remaining but the user wants to write a 200-byte packet. In such an example, the storage system 500 may write a 100-byte null packet at the end of the storage to fill the last packet for wrap over, and then write the user's packet.

Also, suppose there is 200 bytes remaining, and the user wants to write a 195-byte packet, that packet would fit, but then not enough space would remain to write the null packet header. So, instead, a 200-byte null packet is written at the end of the storage, and then the user's packet is written at the beginning of the data portion 520.

In at least one example, the storage system 500 makes use of a single large buffer in shared memory, such as RAM. By adding a stream identifier, such as the stream description and/or the stream key described above, multiple producers may share the same physical buffer. Video consumers have the possibility to process one or more of the available streams.

When a new stream consumer is added, the new stream consumer typically positions its read pointer at the head position, discarding any old data. It is, however, possible to start at any position between the head and the tail position and to efficiently seek by time between them using binary or interpolation search thanks to the chronological ordering of stored records. Further, by adding stream identifiers, the system is able to store the data records in any order among streams, rather than by incrementing the data sources as described above with reference to FIG. 3.

Figure 6:
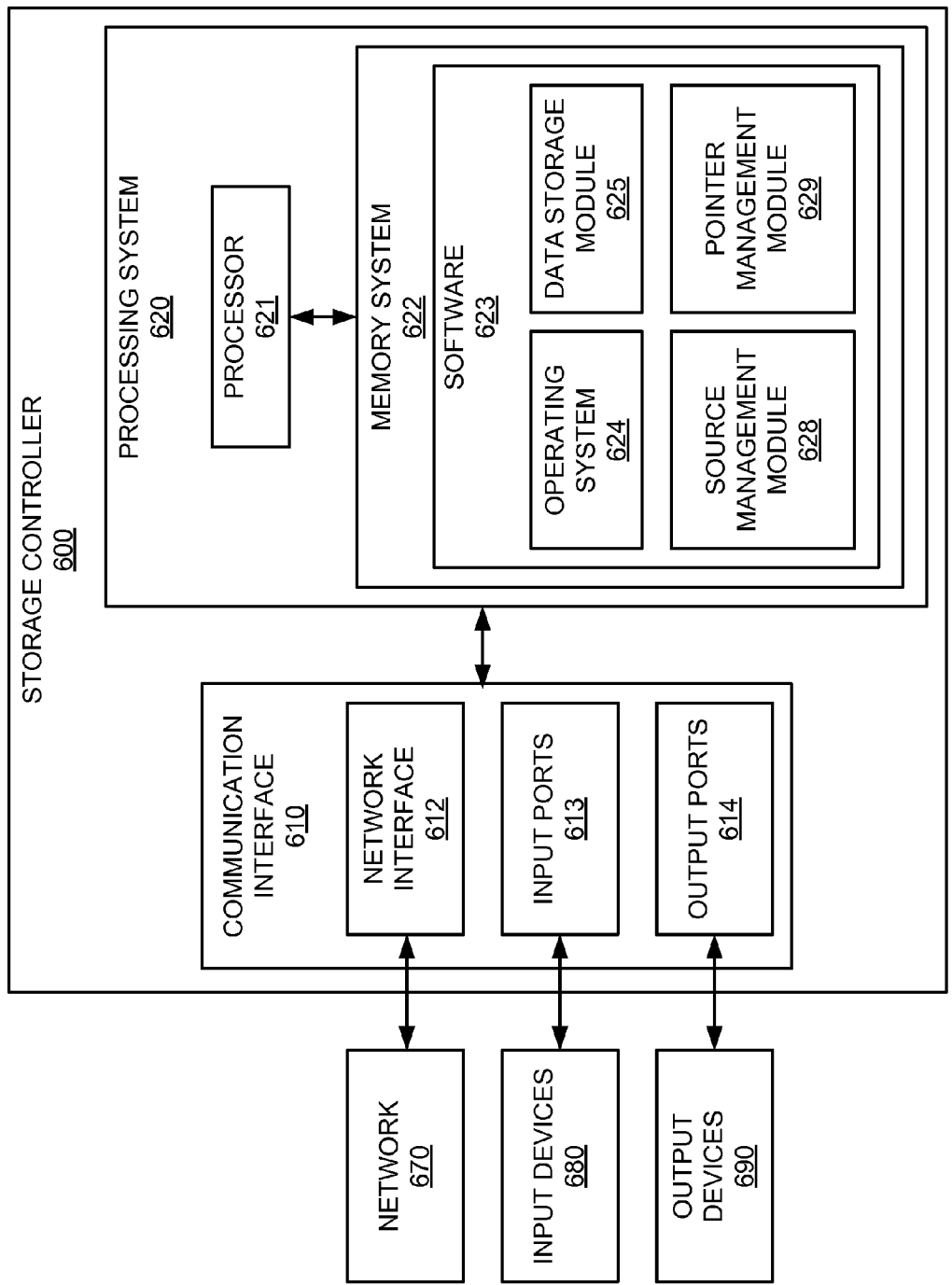
FIG. 6 is a system diagram illustrating a storage controller.

FIG. 6 illustrates storage controller 600. Storage controller 600 includes communication interface 610 and processing system 620. Processing system 620 is linked to communication interface 610 through a communication link. Processing system 620 includes processor 621 and memory system 622.

Communication interface 610 includes network interface 612, input ports 613, and output ports 614. Communication interface 610 includes components that communicate over communication links, such as network cards, ports, RF transceivers, processing circuitry and software, or some other communication device. Communication interface 610 may be configured to communicate over metallic, wireless, or optical links. Communication interface 610 may be configured to use IP, Ethernet, TDM, optical networking, wireless protocols, communication signaling, or some other communication format, including combinations thereof.

Network interface 612 is configured to connect to external devices over a network. Input ports 613 are configured to connect to input devices 680 such as a data source, video source, camera, keyboard, mouse, or other input devices. Output ports 614 are configured to connect to output devices 690 such as a storage system, disk drive, display, printer, or other output device.

Processor 621 includes microprocessor and other circuitry that retrieves and executes operating software from memory system 622. Memory system 622 comprises software 623. Memory system 622 may be implemented using random access memory, read only memory, a hard drive, a tape drive, flash memory, optical storage, or other memory apparatus.

Software 623 comprises operating system 624, data storage module 625, source management module 628, and pointer management module 629. Software 623 may also comprise additional computer programs, firmware, or some other form of non-transitory, machine-readable processing instructions. When executed by processor 621, software 623 directs processing system 620 to operate storage controller system 600 to store data as described herein using data storage module 625, source management module 628, and pointer management module 629.

In many examples of multimedia products, the multimedia products comprise one or more media stream producers and one or more media stream consumers. For example, a digital video recorder could comprise video and audio acquisition equipment as a producer, and recorder equipment to store the media on some form of physical medium as a consumer. When used for playback of the media, the same digital video recorder typically has a file or stream reader to retrieve the media from the physical medium as the stream producer and video/audio display and playback devices as consumers. For design simplicity and efficiency reasons, it may be desirable to split the producers and the consumers into different processes. Consumers and producers may then be connected in many different configurations. For example, a video acquisition producer may be connected to a display output, a recorder and a video analysis consumer alternatively or all at the same time. Some form of buffering must then be used between the producers and the consumers and in the latter case, one may desire to avoid duplicating the same data stream to the multiple consumers.

A typical solution to the above problem involves using discreet memory buffers with reference counting. An empty buffer is selected by the producer, filled, the reference count is initialized to the number of consumers then the buffer descriptor is sent to the consumers. Each consumer can then process the media buffer and decrement the reference count. When the usage count reaches 0, the buffer is returned to the producer for recycling. This strategy has a number of drawbacks. The producer must be aware of the consumers to properly maintain the reference count and have a bidirectional communication channel to each of the consumers to exchange buffer descriptors. Also, management complexity increases if one wants to add and remove consumers dynamically. For example, reference count may need to be updated for "in flight" buffers that are directed to a terminating consumer. Also, discrete buffers of constant size are wasteful for lossy compressed data streams because of the great variability of the compressed buffer data size.

The approaches detailed herein solve these problems with discrete reference-counted buffers. The approach taken herein is to use a single large buffer in shared memory. The shared memory is divided into an index and a data portion. The index portion keeps track of which portion has been written to by which writer. The data portion is written to in a circular manner. When a writer reaches the end of the memory, it continues from the beginning, such as in a wrap operation. For each write, unique record markers are automatically inserted and the index is atomically updated. The record markers are used to synchronize a reader at the beginning of a record. The index also contains a head and a tail pointer. A specific example employing a single large circular buffer is detailed in FIG. 7.

Figure 7:
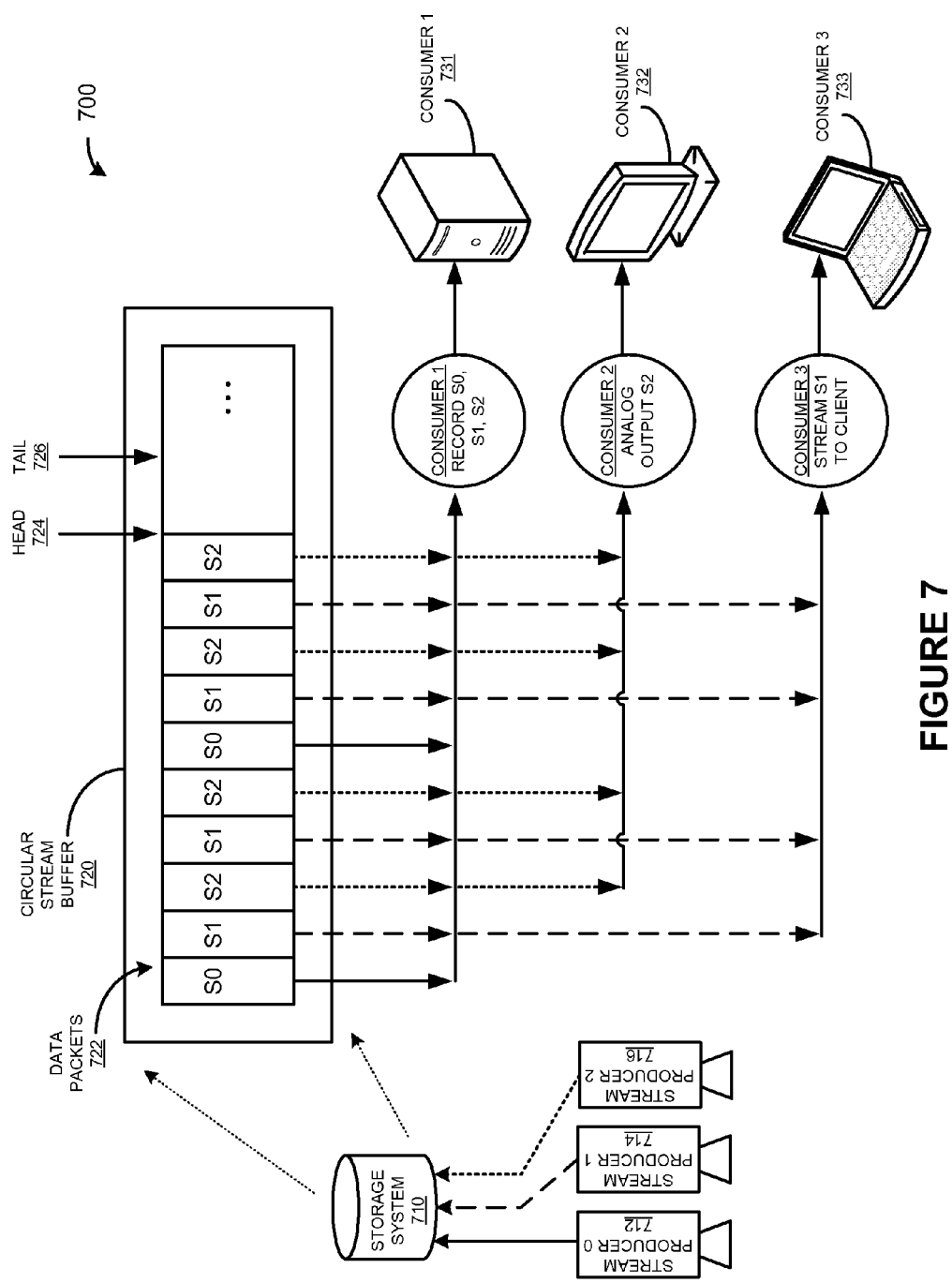
FIG. 7 is a system diagram illustrating a data system.

FIG. 7 is a system diagram illustrating data system 700. Data system 700 includes stream producers 712-714, storage system 710, circular stream buffer 720, and consumers 731-733. Stream producers 712-714 each comprise video sources in this example, and are communicatively coupled to storage system 710 to store video data therein as data producers. Circular stream buffer 720 is included in storage system 710, as indicated by the expanded view arrows in FIG. 7. Also, each of consumers 731-733 is communicatively coupled to storage system 710, to retrieve video data therefrom as data consumers. Physical links between the various producers, storage systems, and consumers are not shown in FIG. 7 for clarity.

Stream producers 712-714 each capture video of various associated video scenes, and digitizes the video for transfer and storage by storage system 710. Although video cameras are shown in this example, other video or non-video data sources could be employed. Each of the stream producers has a stream identifier associated therewith, namely stream identifiers 0-2. The stream identifiers are stored with the video data in circular stream buffer 720 in this example. In other examples, the stream identifiers correspond to the source identifiers discussed herein.

Consumers 731-733 each request for data to be retrieved from circular stream buffer 720, where the requests each identify at least one data stream. In this example, the first consumer 731 comprises a data storage device, such as a server, storage array, data archival system, cloud storage system, or other data storage system. Consumer 731 is configured to archive data related to all 3 streams present in circular stream buffer 720, namely streams S0-S3. Second consumer 732 comprises a video viewing device, such as a monitor, television, projector, or other video monitoring and display device. Second consumer 732 is configured to display one stream, namely stream S2. Third consumer 733 comprises a client device, such as a personal computer, laptop, mobile smartphone, gaming system, server, or other computing device for displaying, storing, or transferring a video stream. Third consumer 733 is configured to stream one of the streams of circular stream buffer 720, namely S1 in this example.

Storage system 710 comprises a computer readable storage medium, such as a data cache, data buffer, server, storage array, data archive, cloud storage system, random-access memory device, solid state memory device, shared memory, shared memory device, or other data storage systems and equipment. Storage system 710 also comprises data transfer interfaces for routing data to and from an associated computer readable storage medium, and could include a storage controller. Storage system 710 could be an example of storage system 120 in FIG. 1, or storage system 420 in FIG. 4, although other configurations could be employed.

Circular stream buffer 720 is an example of data portion 520 in FIG. 5, although data portion 520 could include other configurations. Data indexing information is omitted from FIG. 7 for clarity. Circular stream buffer 720 includes data packets 722 associated with a plurality of video streams, namely S0-S2. The data packets discussed for FIGS. 7 and 8 could be examples of the data records discussed herein. Several pointers are associated with various locations of circular stream buffer 720, namely head pointer 724 and tail pointer 726. New data packets are written by storage system 710 into buffer 720 at the head position, namely head 724. The tail position, namely tail 726, indicates where the oldest usable data begins for a consumer to read.

Each pointer comprises a rotation indicator and a location indicator. The rotation indicator denotes a usage rotation or cycle of the circular buffer structure for which the pointer is associated. For example, after a new buffer is initialized, the initial rotation could have a rotation indicator of '0'. As the circular buffer fills up and the head pointer points to the end location of the circular buffer, the head pointer would 'wrap' and point the beginning location of the circular buffer, and have a '1' rotation indicator. Further wrappings would increase the rotation counter accordingly. However, a restricted subset could be employed with only two rotation counts since the head pointer is typically not configured to outpace the tail counter by more than one rotation. Likewise, the tail pointer would have a rotation indicator, which may lag the head pointer rotation indicator if the head pointer has wrapped while the tail pointer has not. The location indicator indicates where the pointer points to within buffer 720, such as a memory address, offset indicator, packet counter, or other location indicator. It should be understood that the head pointer is always greater than or equal to the tail pointer, considering both the rotation indicator and the location indicator. It should also be understood that the data flow shown in FIG. 7 is not meant to indicate any sequential or timing-oriented nature of FIG. 7. Instead, the data flow in FIG. 7 is merely intended to show which data packets are routed to which consumers. One example of the timing-oriented read nature of FIG. 7 is detailed in FIG. 8.

Figure 8:
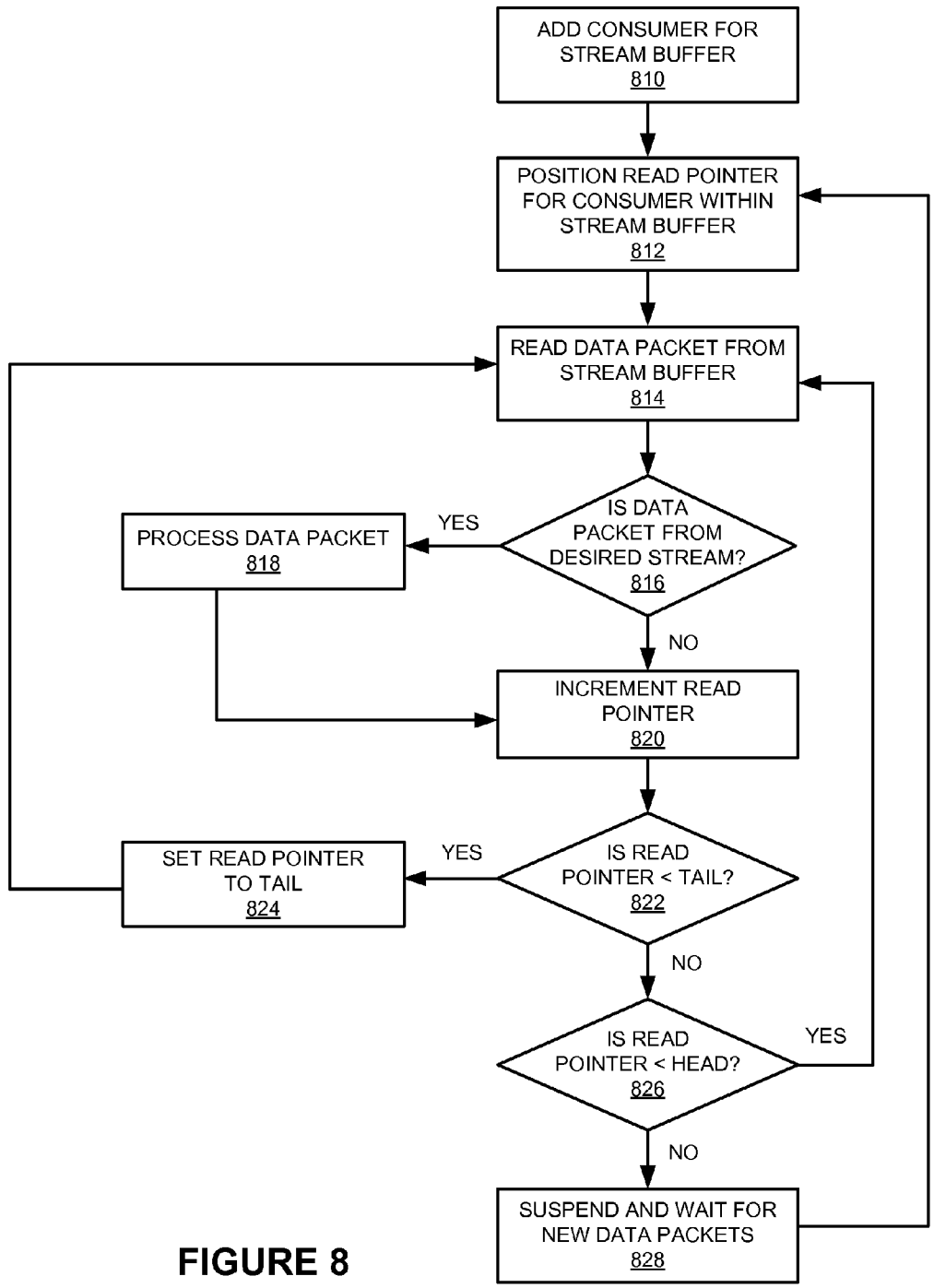
FIG. 8 is a flow diagram illustrating a method of operating a data system.

FIG. 8 is a flow diagram illustrating a method of operation of system 700. The operations of FIG. 8 are referenced herein parenthetically. In FIG. 8, a consumer for circular stream buffer 720 is added (810). The consumer could be any of consumers 731-733, or could be other consumers not shown in FIG. 7. In this example, circular stream buffer 720 has two main access pathways, namely the producer and consumer pathways. The producer pathway includes video data written into circular stream buffer 720, such as by stream producers 712-716. The consumer pathway includes video data read from circular stream buffer 720, such as by consumers 731-733. When a consumer is added, the consumer could transfer a request to an interface system of storage system 710 to access data streams stored in circular stream buffer 720. The request could include a stream identifier to identify desired data associated with a particular stream in buffer 720, and could also include a destination address among other information. For example, if consumer 3 (consumer 733) desired to retrieve data for stream S1 from buffer 720, then consumer 3 could transfer a stream request for stream S1 to storage system 710 or other systems associated with storage system 710. Other consumers could transfer requests in a similar manner for other data.

In response to adding a consumer, storage system 710 positions (812) a read pointer for the consumer within circular stream buffer 720. The read pointer could be positioned at a variety of locations. In one example, the read pointer is positioned at the head position, namely head 724, which would allow the consumer to begin reading any new data written into buffer 720. However, the read pointer could be positioned at any position between the head and the tail pointers of buffer 720, and the consumer could seek by forward or backward in time among the video data due to the chronological ordering of video data written by producers into buffer 720. A binary search or interpolation search could be employed to seek among the video data based on chronological order.

Wherever the read pointer is initially positioned, the data packet pointed to by the read pointer is read (814) from buffer 720. If the data packet is from the requested stream, then the data packet is processed (818), where the processing could include storage system 710 transferring the data packet to the appropriate consumer. In some examples, portions of the data packet are removed, such as a recovery header or other information, before transfer of a data or payload portion for delivery to the appropriate consumer.

However, if the data packet is not from the requested stream, then the read pointer is incremented (820). The read pointer is then processed against a few criteria. First, if the read pointer, after incrementing, is less than the tail pointer (822), then the read pointer is set to the value of the tail pointer (824), and a further data packet is read from buffer 720. In this first case, then data has been lost due to insufficient buffering by buffer 720, or because a slow consumer has not kept up with the tail pointer's incrementing as new data is written into buffer 720. If this first case occurs for only one consumer, then only that consumer is affected by the data loss. Other consumers reading from buffer 720 are free to continue, and producers are free to continue writing data into buffer 720. In contrast, in traditional reference counted buffers, should one consumer be delayed and stop processing data, then the tail pointer cannot be moved as new data is desired to be written, and producers are left without any usable buffer space.

In a second of the criteria, if the read pointer after the incrementing in operation 820 is less than the head pointer (826), then a further data packet can be read from buffer 720. The further data packet can then be processed (816-818) and possibly transferred to the appropriate consumer. This second condition comprises a normal read from buffer 720.

In a third of the criteria, if the read pointer after the incrementing in operation 820 is not less than the head pointer (826), then the read process associated with the particular consumer is suspended to wait for new data packets to be written into buffer 720 by the various producers. This third condition comprises a fast consumer, where data being read out of buffer 720 outpaces data being written into buffer 720 for the particular stream. As with the first condition above, other consumers reading from buffer 720 are free to continue, and producers are free to continue writing data into buffer 720. After a period of time to wait for more data packets to be written into buffer 720, the read pointer is repositioned (812) in buffer 720, and further read processing can continue for the suspended consumer.

In another example, a data storage system receives a plurality of requests from a plurality of data consumers for data streams from a shared memory, where the requests include stream identifiers associated with the data streams. In some examples, the stream identifiers correspond to source identifiers as discussed herein. The data storage system would then position read pointers within the shared memory for the requests, and retrieve data records from the shared memory for the requests based on the read pointers. In some examples, the data records correspond to the data packets discussed in FIGS. 7 and 8. The data storage system transfers ones of the data records as the data streams to each of the data consumers based on the stream identifiers. For example, if a first data consumer requests a first data stream, then the data storage system would transfer data records associated with the first data stream to the first data consumer. Other data records associated with data streams could likewise be transferred to other data consumers. The data storage system increments associated ones of the read pointers after retrieving and transferring each of the ones of the data records, where further data records are retrieved from the shared memory based on the incremented read pointers.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of storing data records, comprising:
    initializing a shared write pointer to a first location in a shared memory of a data storage system;
    receiving a plurality of data records transferred by a plurality of data sources for storage in the shared memory;
    beginning with a first of the plurality of data sources, writing in a cyclic sequence one of the plurality of data records for each of the plurality of data sources based on the shared write pointer, and incrementing the shared write pointer after each writing;
    updating at least a header portion of the shared memory with the shared write pointer responsive to each writing.

2. The method of claim 1, further comprising:
    writing a source identifier for an associated one of the plurality of data sources with each one of the plurality of data records.

3. The method of claim 1, further comprising:
    identifying when the shared write pointer corresponds to an end to the shared memory, and responsively incrementing the shared write pointer to the first location in the shared memory.

4. The method of claim 3, wherein further writes to the shared memory after incrementing the shared write pointer to the first location in the shared memory overwrite old data records stored within the shared memory.

5. The method of claim 3, further comprising:
    responsive to incrementing the shared write pointer to the first location in the shared memory, incrementing a rotation counter and writing the rotation counter with each one of the plurality of data records.

6. The method of claim 1, further comprising:
    receiving a plurality of requests from a plurality of data consumers for data streams from the shared memory, wherein the requests include stream identifiers for identifying desired data streams;
    positioning read pointers within the shared memory for the requests based on the first location;
    reading data records from the shared memory for the requests based on the read pointers;
    transferring ones of the read data records as the data streams to each of the data consumers based on the stream identifiers;
    incrementing associated ones of the read pointers after reading and transferring each of the ones of the read data records, wherein further read data records are read from the shared memory based on incremented read pointers; and
    updating at least the header portion of the shared memory with the incremented read pointers responsive to each reading.

7. The method of claim 6, further comprising:
    writing a source identifier for an associated one of the plurality of data sources with each one of the plurality of data records; and
    wherein the stream identifiers correspond to data records written with a desired source identifier.

8. The method of claim 6, further comprising:
    updating an index in the shared memory comprising the source identifiers for the plurality of data sources each related to pointer to a beginning of the plurality of data records for an associated data source and a pointer to an end of the data records for the associated data source.

9. The method of claim 1, wherein the plurality of data records are written to a data portion of the shared memory, wherein the header portion of the shared memory comprises a different portion of the shared memory than the data portion.

10. The method of claim 1, wherein the plurality of data records each comprise video data records.

11. A data storage system, comprising:
    a plurality of data sources;
    a shared storage volume accessible to the plurality of data sources;

and a storage controller configured to:
   receive a first data record;
   identify a source of said first data record to generate a source identifier;
   store on the shared storage volume source identifier identified in the first data record in an index;
   store on the shared storage volume the first data record at a first storage location indicated by a pointer;
   increment the pointer after storing the first data record;
   receive a second data record; and
   store on the shared storage volume the second data record at a second storage location indicated by the incremented pointer.

12. The data storage system of claim 11, comprising:
the storage controller configured to write additional data records to the shared storage volume in a circular manner such that writing additional data records at sequential storage locations overwrites oldest data records stored within the shared storage volume.

13. The data storage system of claim 12, comprising:
the storage controller configured to receive a plurality of requests from a plurality of data consumers for data streams from the shared storage volume, wherein the requests include stream identifiers associated with the data streams;
the storage controller configured to position read pointers within the shared storage volume for the requests based on the index, and retrieve data records from the shared storage volume for the requests based on the read pointers;
the storage controller configured to transfer ones of the retrieved data records as the data streams to each of the consumers based on the stream identifiers; and
the storage controller configured to increment each of the read pointers after retrieving and transferring each of the ones of the data records, wherein further data records are retrieved from the shared storage volume based on the incremented read pointers.

14. The data storage system of claim 12, wherein the plurality of sources each comprise video sources.

15. The data storage system of claim 12, comprising:
the storage controller configured to increment a source counter after the first data record is stored to set a source identifier for the second data record as a second source and update the index.

16. The data storage system of claim 11, wherein the storage controller is configured to cause the index, the first data record, and the second data record to be written to a data portion of the shared storage volume and wherein the shared storage volume further comprises a header portion, the header portion comprising pointers to data records and index information stored in the data portion.

17. The data storage system of claim 16, wherein the pointers comprise a head pointer, a tail pointer, and an index portion.

18. The data storage system of claim 11, comprising;
the storage controller configured to identify a second source for the second data record, generate a source identifier for the second data record, and update the index.

19. A non-transitory computer readable medium having instructions stored thereon, that
when executed, perform the steps of:
   receiving in a data storage system a first data record;
   identifying a source of said first data record to generate a source identifier;
   storing the source identifier identified in the first data record in an index;
   storing the first data record at a first storage location indicated by a pointer;
   incrementing the pointer after storing the first data record;
   receiving a second data record; and
   storing the second data record at a second storage location indicated by the incremented pointer;
wherein the non-transitory computer medium has further instructions
stored thereon, that when executed, perform the steps of:
   receiving, in the data storage system, a plurality of requests from a plurality of data consumers for data streams from a shared memory comprising the first data record, the second data record, and further data records, wherein the requests include stream identifiers associated with the data streams;
   positioning read pointers within the shared memory for the requests based on the index;
   retrieving data records from the shared memory for the requests based on the read pointers;
   transferring ones of the retrieved data records as the data streams to each of the data consumers based on the stream identifiers; and
   incrementing associated ones of the read pointers after retrieving and transferring each of the ones of the data records, wherein further data records are retrieved from the shared memory based on the incremented read pointers.

\* \* \* \* \*